US007079850B2

United States Patent
Cameron

(10) Patent No.: US 7,079,850 B2
(45) Date of Patent: Jul. 18, 2006

(54) LOCALIZATION OF RADIO-FREQUENCY TRANSCEIVERS

(75) Inventor: Richard Neill Cameron, Le Rouret (FR)

(73) Assignee: Accenture Global Services GmbH (CH)

(*) Notice: Subject to any disclaimer, the term of this patent is extended or adjusted under 35 U.S.C. 154(b) by 0 days.

(21) Appl. No.: 10/510,415

(22) PCT Filed: Mar. 23, 2003

(86) PCT No.: PCT/EP03/03795

§ 371 (c)(1),
(2), (4) Date: Oct. 6, 2004

(87) PCT Pub. No.: WO03/086000

PCT Pub. Date: Oct. 16, 2003

(65) Prior Publication Data

US 2005/0130668 A1    Jun. 16, 2005

(30) Foreign Application Priority Data

Apr. 11, 2002 (EP) ................................. 02354059

(51) Int. Cl.
*H04Q 7/20* (2006.01)
*H04Q 7/24* (2006.01)
*H04M 11/00* (2006.01)
*H04B 7/00* (2006.01)

(52) U.S. Cl. ............................. 455/456.1; 455/426.1; 455/406; 455/408; 370/338; 375/225

(58) Field of Classification Search ............. 455/456.1, 455/456.5, 422.1, 134, 135, 426.1, 406, 408; 375/132, 147, 225; 342/463; 370/338; 380/248; 340/527.1
See application file for complete search history.

(56) References Cited

U.S. PATENT DOCUMENTS

| 5,634,204 A | * | 5/1997 | Takahashi et al. ......... 455/134 |
| 5,909,462 A | * | 6/1999 | Kamerman et al. ......... 375/147 |
| 5,940,764 A | | 8/1999 | Mikami |

(Continued)

FOREIGN PATENT DOCUMENTS

WO    00/38460    6/2000

(Continued)

OTHER PUBLICATIONS

Brewin, B., "Wirless LANs", Computer World, Mar. 25, 2002.

(Continued)

*Primary Examiner*—William Trost
*Assistant Examiner*—Kiet Doan
(74) *Attorney, Agent, or Firm*—Brinks Hofer Gilson & Lione

(57) ABSTRACT

The invention concerns a localization and communication methods and system between mobile stations and a central server through a wireless network comprising a plurality of wireless radio-frequency transmitting access points (AP1–AP4), among which a first access point is chosen to perform the communication, comprising the steps of measuring the signal strengths received by said station from the plurality of access points; storing each measured strength with an address identifying the corresponding connected access point; comparing said stored strengths to values of a predetermined table of signal strength thresholds affected to access points, defining one or more event zones (EVA, EVB) each comprising one or more attenuation ranges of one or more access points; and considering the station as located in a given event zone if the measured strength corresponding to an access point defining that event zone is comprised in the attenuation range of that access point.

15 Claims, 2 Drawing Sheets

U.S. PATENT DOCUMENTS

| | | | | |
|---|---|---|---|---|
| 5,987,062 | A * | 11/1999 | Engwer et al. | 375/225 |
| 5,991,287 | A * | 11/1999 | Diepstraten et al. | 370/338 |
| 6,044,261 | A * | 3/2000 | Kazmi | 455/408 |
| 6,205,326 | B1 * | 3/2001 | Tell et al. | 455/406 |
| 6,212,390 | B1 | 4/2001 | Rune | |
| 6,529,164 | B1 * | 3/2003 | Carter | 342/463 |
| 6,552,661 | B1 * | 4/2003 | Lastinger et al. | 340/572.1 |
| 6,671,506 | B1 * | 12/2003 | Lee | 455/406 |
| 6,731,936 | B1 * | 5/2004 | Chen et al. | 455/437 |
| 6,738,628 | B1 * | 5/2004 | McCall et al. | 455/456.1 |
| 6,901,255 | B1 * | 5/2005 | Shostak | 455/422.1 |
| 6,901,264 | B1 * | 5/2005 | Myr | 455/456.5 |
| 6,922,405 | B1 * | 7/2005 | Eikelenboom et al. | 370/338 |
| 2001/0036833 | A1 | 11/2001 | Koshima et al. | |
| 2002/0085719 | A1 * | 7/2002 | Crosbie | 380/248 |
| 2003/0035464 | A1 * | 2/2003 | Dehner et al. | 375/132 |

FOREIGN PATENT DOCUMENTS

| | | |
|---|---|---|
| WO | 01/33825 A1 | 5/2001 |

OTHER PUBLICATIONS

Varrall, G., "Cordless Computer Connectivity", Dect Web, © 1998-2003.

* cited by examiner

LOCALIZATION OF RADIO-FREQUENCY TRANSCEIVERS

CROSS REFERENCE TO PRIORITY APPLICATION

This application is a 35 U.S.C. §371 filing of PCT/EP03/03795, filed 25 Mar. 2003, and claims priority to European Patent Application 02354059.4, filed 11 Apr. 2002.

FIELD OF THE INVENTION

The present invention generally relates to a communication method and a system between a central server and mobile transceivers, called hereafter "stations", through a radio-frequency (RF) wireless network. More particularly, the invention relates to such a system able to work indoors or in public places.

BACKGROUND

In an indoor or public space environment, there is a need for a communication system able to dedicate applications (for example, access to specific services) on the basis of the location of a user (more precisely, a user station). A problem is to localize the stations in the environments with respect to physical areas to which dedicated proximity based application(s) are related.

Many outdoor localization techniques are known. For example, the GPS (Global Positioning System), the triangulation from earth fixed transceivers, the radio angle measurements, are efficient outdoor localization systems. However, such systems are unable to perform an indoor (in-building) localization due to the shielding resulting from walls and radioelements. Such perturbing elements that can also be present outside render the above systems not very precise even outdoors.

A first known indoor localization system uses fixed infrared transceivers located in a building. The system determines in the field of which transceiver is the object and considers this field area as the location. A drawback of such a system is that many infrared fixed transceivers have to be installed in the building due to the poor range of IR access points, and their limitations to being line-of-site. Further, such a system has to be dedicated to the localization. Additionally, the data carrier bandwidth of IR-systems is not sufficient for most of the applications of wireless system for which the required transmission rate becomes higher and higher.

Recent indoor communication systems use radiofrequency transmission. Such systems provide fixed access points to the wireless communication network, which are distributed inside the building or public space to be covered. A station is connected to the network through the access point from which it receives the higher signal strength. This determination is made by the station itself which examines the signal levels received from the different access points, and then chooses one of these to communicate with to access network resources. The network routing protocol takes into account the access point choice of the station in order to switch the communication to the right access point. Of course, such systems also work outdoors, and at least a part of the access points can be located outdoors. For example, networks in accordance with the standard 802.11b to which the present invention applies more particularly belong to this type of systems.

Recently, some of these systems have been provided with a localization function of the stations, that is a determination of the physical location (and not only the determination of the access point to be connected to).

An example of such in-building radio-frequency wireless network system is described in the article "A Software System for Locating Mobile Users: Design, Evaluation, and Lessons" by Paramvir Bahl, Venkata N. Padmanabhan and Anand Balachandran, published in December 2000, published at http://www.cs.ucsd.edu/users/abalacha/research/papers/msr-tr-2000-12.pdf as of November 2001. In that system, a history-based station-tracking algorithm takes into account the motion of the user station in order to follow this motion from an access point to another using a pre-determined and configured database representing a static signal strength map in principle.

Another example is described in the article "Determining User Location for Context Aware Computing Through the Use of a Wireless LAN Infrastructure" by Jason Small, Asim Smailagic and Daniel P. Siewiorek, published in December 2000, published on http://www-2.cs.cmu.edu/~aura/publications.html. Such a system uses a triangulation technique based on signal intensity from wireless access points.

US 2001/036833 discloses a localization system in which the mobile stations monitor the electric field intensity received from a plurality of repeaters. The mobile stations transmit to a central server the measured intensities. The central server localizes the mobile stations according to wave propagation pattern information contained in the central server.

WO 00/38460 discloses a localization system in which mobile stations transmit identity information at a predetermined power level. Localization beacons receiving this information respond to the mobile stations only if the received signal level is higher than a predetermined threshold.

A purpose of the present invention is to provide another localization method and system.

Another purpose of the present invention is to provide such a localization method and system particularly adapted to dedicate application(s) to the relative location of the stations.

Another purpose of the present invention is to provide such a method and system which do not need structural hardware modification of the existing mobile stations, wireless access points and central server.

Another purpose of the present invention is to provide a communication method and system between mobile stations and at least one central server through a radio-frequency wireless network, using proximity based applications.

Another purpose of the present invention is to provide a method and system adapted to omnidirectional RF system and, more particularly, to one unregulated spectrum standard suites.

SUMMARY OF THE INVENTION

To attain these purposes and others, the present invention provides measuring the strengths or levels of the signal received from a plurality of access points, by a mobile station to be located, storing the measured values with identifying physical addresses of the corresponding access points, and matching the stored values with signal strength thresholds of a table of event zones delimited by at least a signal strength boundary around an access point.

According to the present invention, an event zone corresponds to one or more attenuation ranges delimited by signal strength boundary(ies) around at least one access point. One or more event zones are defined in the wireless network environment depending on the physical location of the access points.

A feature of the present invention is to use, for the access points of a local area network, preferably of the 802.11b standard, signal strength attenuation thresholds to define, around the access points, attenuation ranges which are parts of event zones, and to use these virtual ranges to determine in which event zone(s) a mobile station communicating with one of the access points is located.

Applied to an indoor environment, the invention takes benefit of the fact that, even if a wall or similar RF affector constitutes a partial screen for the RF-field of an access point, it is not a drawback for the invention. Indeed, in an indoor environment, the event zone boundaries will often correspond to the wall of the building or of the rooms— depending on the variable adjustable attenuation range threshold(s) that are included in the definition of the event zone(s). Therefore, the attenuation of the wall contributes to the definition of the event zones.

According to the present invention, the communication link itself is not modified. For example, applied to a system selecting the access point from which the mobile station receives the highest signal strength, the communication is according to the invention still made through that way, independently from the determination of the event zone(s) to which the station belongs.

Another feature of the present invention is to launch or trigger applications or services based on the event zone(s) in which a given mobile station is located. In other words, having determined one or more event zones in which is located a station, a particular communication, which depends on the event zone(s) is established between that station and a central server.

As for the communication link itself, the location of a given mobile station with respect to the event zone(s) is periodically checked in order to update the proximity based applications if necessary.

BRIEF DESCRIPTION OF THE DRAWINGS

The foregoing and others purposes, features, aspects and advantages of the invention will become apparent from the following detailed description of embodiments, given by way of illustration and not limitation with reference to the accompanying drawings.

Figure 1:
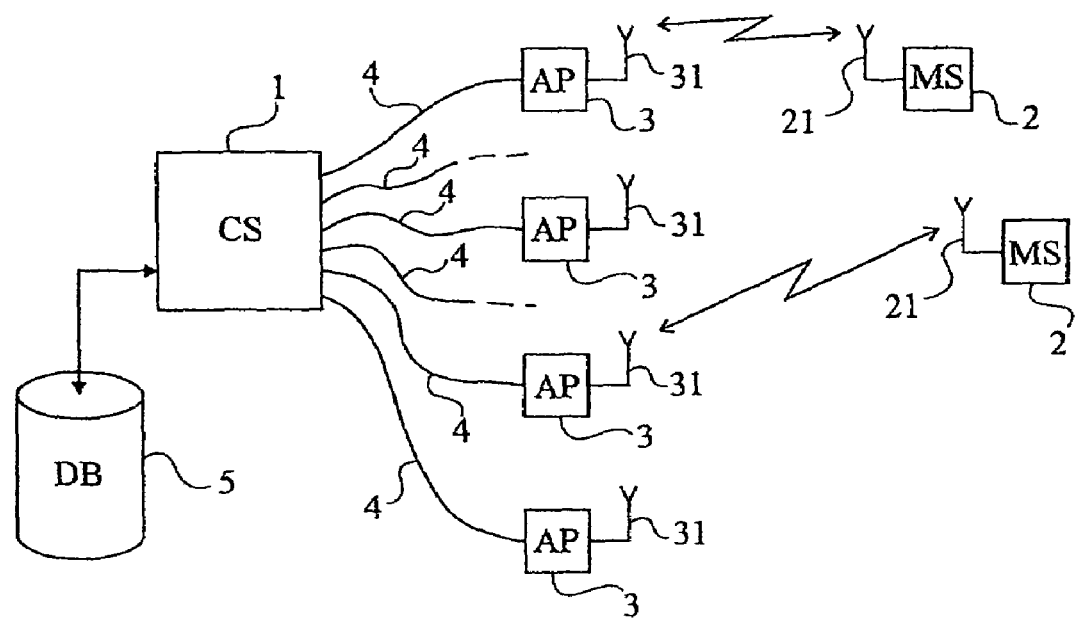
FIG. 1 is a schematic representation of the main elements of a communication system to which the present invention applies.

For clarity, only the basic steps and elements that are necessary to the understanding of the present invention have been shown in the drawings and details will be described hereafter. In particular, the implementation of the invention by means of computerized systems will not be detailed as being in the ability of one skilled in the art. Further, the features of a local area network corresponding to the 802.11b standard will not be detailed as being well known by those skilled in the art.

DETAILED DESCRIPTION OF THE INVENTION

FIG. 1 schematically represents the main components of a communication system to which the present invention applies.

A central server (CS) 1 is made, for example, of a network computer or any conventional computerized system, able to organize and control network communications, preferably according to one unregulated spectrum standard suites. The invention applies to network communications, preferably according to one unregulated spectrum standard, such as ISM bands. Today, ISM (Industrial, Scientific, Medical) bands are proposed at a suitable frequency allocation given that it is available globally (though the amount of spectrum in a band is not always the same in each country). The ISM bands are unregulated bands—anyone can use a band provided the maximum ERP of any device used does not exceed 100 mW (+20 dBm), with most devices operating at 1 mW (0 dBm). For example, the invention applies to the following Wireless Local Area Networks (WLAN): 802.11, 802.11a, 802.11b, 802.11e, 802.11f, 802.11g, 802.11h, 802.15.1, 802.15TG2, 802.15TG3, 802.15TG4, and to the following other unregulated spectrum standards: Bluetooth, Wi-Fi, HiperLAN1, HiperLAN2 and other emerging or relevant WLAN, PAN, and WMAN/WANs standards.

The central server 1 is generally connected to a wired network (not shown). Mobile devices (MS) 2, called stations (for example Personal Computers or Personal Digital Assistants equipped with wireless network interface cards, or phones with 802.11b dual chipsets), provided with RF transceivers (symbolized by antennas 21), can communicate with the central server 1 through access points (AP) 3. The access points 3 are wired to the central server (wires 4) and provided with RF transmitting means (symbolized by antennas 31). Access points act as interfaces between the server and the stations, i.e. the wireless and wired networks. Other stations (not shown) are usually wire connected to the central server. However, the invention more particularly applies to wireless mobile stations. In FIG. 1, a database (DB) 5 is connected to the central server. Database 5 aims at containing conventional data and programs, or retrieves data and programs or services via a network, and correspondence tables between the signal level thresholds associated to each access point and the corresponding event zones of the environment to be covered by the system according to the invention.

The access points are distributed according to the environment to be covered. In the preferred application of the invention, the environment is, at least partially, indoor.

As in a conventional wireless network according to the 802.11b standard, a mobile station wanting to establish a communication with the central server selects, among the access points, the one from which it receives the highest signal strength or level. Each access point has an access point address, which is unique in the environment. A station wishing to establish a communication compares the received signal strengths of the multiple access points it can see. The station then registers the access point that has the strongest received signal strength and uses that access point as its connection to the central server. The central server then uses the corresponding access point to exchange data with the station. Each access point has a unique identifying address (called its MAC address which is defined by the IEEE and controlled to be unique globally). The station communicates the MAC address of its current connected access point to the central server to be used for the localization, event zone identification, and application association for that station in that attenuation area in that event zone.

Figure 2:
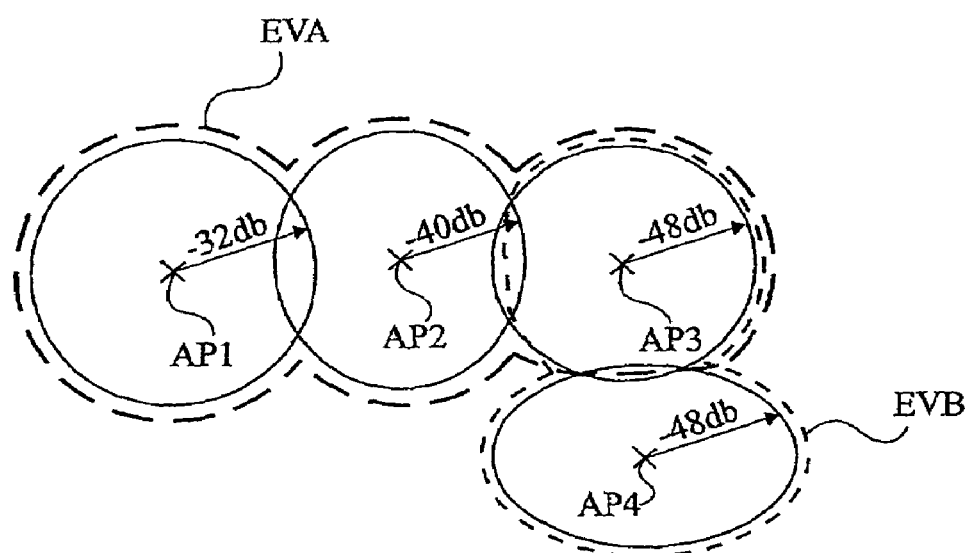
FIG. 2 illustrates coverage areas and attenuation ranges of defined event zones according to an embodiment of the present invention.

According to the invention, the event zones are based on the signal attenuation around several access points. In other words, an event zone is limited by a virtual boundary of signal strength around one or several access points. For example, a first event zone EVA comprises the physical area corresponding to field areas of three access points AP1, AP2, AP3 for which the attenuation of the signal is, respectively, lower than −32 dB, −40 dB and −48 dB. In FIG. 2, the attenuation ranges have been shown in full lines, and the event zone EVA has been delimited with long portions dotted line. A second event zone EVB is shown (in short portions dotted line) and comprises the attenuation ranges lower than −48 dB of the access point AP3 and of a fourth access point AP4. The attenuation ranges used by the invention to define an event zone may or may not be the same in terms of attenuation, for each access point of that zone.

According to a preferred embodiment of the present invention, at least one specific application is dedicated to each event zone defined in the corresponding environment. The specific application can be data communicated to the mobile station(s) in the zones, programs stored in the central server or network which are executed for the mobile stations located in a given event zone, or services rendered available for the mobile stations located in the corresponding event zone(s).

For example, in a bank building in which event zones corresponding to bank services are delimited, an account consulting event zone can be defined in a physical area of the bank. When a user and its mobile station (for example, his personal digital assistant) comes into that area, the central server communicates to the station the balance of the bank account of the user. Another event zone can be a stock exchange ordering zone in which the user can be connected to the order office of the bank. Out of the corresponding zone, the functionality is not available to the station.

FIG. 2 schematically illustrates an embodiment of the localization and communication methods according to the present invention. These methods are, for example, implemented in a communication system as illustrated in FIG. 1.

According to the invention, the event zones are based on the signal attenuation around several access points. In other words, an event zone is limited by a virtual boundary of signal strength around one or several access points. For example, a first event zone EVA comprises the physical area corresponding to field areas of three access points AP1, AP2, AP3 for which the attenuation of the signal is, respectively, lower than −32 dB, −40 dB and −48 dB. In FIG. 2, the attenuation ranges have been shown in full lines, and the event zone EVA has been delimited with long portions dotted line. A second event zone EVB is shown (in short portions dotted line) and comprises the attenuation ranges lower than −48 dB of the access point AP3 and of a fourth access point AP4. The attenuation ranges used by the invention to define an event zone can or not be the same in terms of attenuation, for each access point of that zone.

For clarity, the areas have been shown approximately circular in FIG. 2. However, as it will be better understood in connection with FIG. 3, these areas may have other shapes.

Figure 3:
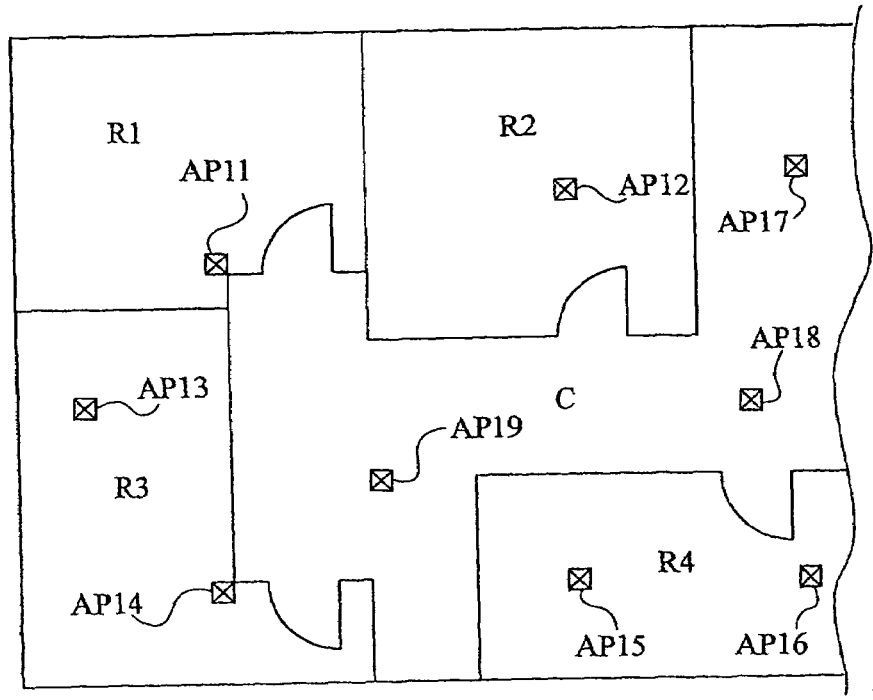
FIG. 3 is a schematic representation of an indoor environment in which is implemented an embodiment of the present invention.

FIG. 3 schematically represents an indoor environment to which the present invention applies.

In FIG. 3, four rooms R1, R2, R3, R4 and one corridor C of a building have been shown. Access points AP11–AP19 are distributed in the indoor environment. The access points are, for example, distributed into the indoor environment so as to give the ability to the central server to be connected to any mobile station coming into the environment.

According to the present invention, the signal level thresholds used as boundaries of the attenuation ranges of the access points to define the event zones are fixed on the basis of the environment. In other words, knowing the physical map of the environment and the event zones to be created, the system is configured to define the level thresholds of the various access points.

For example, four event zones EV1–EV4 are defined in the environment of FIG. 3. These event zones approximately correspond to the different rooms as follows:

Event zone EV1: attenuation ranges around access points AP11, AP15 and AP16 with level thresholds chosen to correspond to rooms R1 and R4;

Event zone EV2: attenuation range around access point AP12 with level threshold chosen to correspond to rooms R2;

Event zone EV3: attenuation ranges around access points AP13 and AP14 with level thresholds chosen to correspond to rooms R3; and Event zone EV4: attenuation ranges around access points AP17, AP18 and AP19 with level thresholds chosen to correspond to corridor C.

It should be noted that, for the implementation of the invention, the variations of the signal strength boundaries around an access point due to modifications of the environment (number of stations in the field of the access points, number of human bodies, humidity, etc.) can be compensated by providing overlapping attenuation ranges of the access points defining each event zone. Then, even if the attenuation range of a given access point becomes smaller, a station can still be localized in the event zone because it is in the field of another attenuation range.

Figure 4:
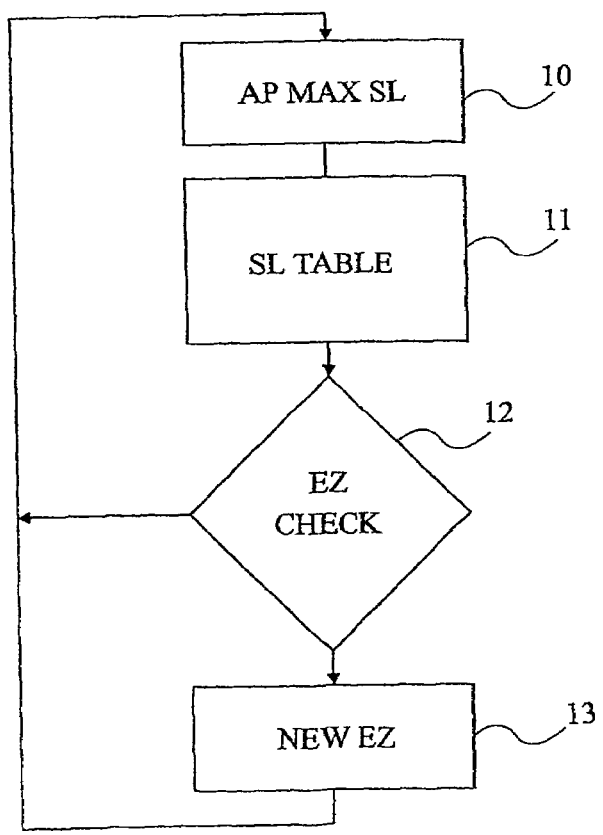
FIG. 4 is a flow chart of an implementation of the localization method according to the present invention.

FIG. 4 is a simplified flowchart of the communication method according to the present invention.

The flowchart of FIG. 4 illustrates a loop for the localization and the access point selection. Preferably, these two determinations are made with the same periodicity (in the same loop). According to this example, the first step (block 10, AP MAX SL) consists in establishing a communication between the station and the central server, in a conventional way, through the access point from which the station receives the highest signal level. According to the invention, the signal level values are stored dynamically only during the loop (block 11, SL TABLE) by the station with the identifying addresses of the corresponding access point it is connected to. Then (block 12, EZ CHECK), the received signal level measurement of the access point being used is compared to the predetermined threshold value(s) stored in a dedicated table to define the event zones. These comparisons lead to the localization of the station in term of event zone(s) in which the station is present. If the event zone is the same as in the preceding loop, the processing returns to block 10 for the next periodical check. If the event zone is not the same as in the preceding loop, the station is affected to a new event zone (block 13, NEW EZ) and the corresponding event (application) starts. Or if the station is not in a defined event zone, a pre-determined application or information is affected to the station.

According to a first embodiment of the present invention, a mobile station periodically checks the signal levels received from the various access points, and stores in a table the received signal level measurements and the corresponding access point address. Then, the obtained data of access point address and reception levels is transmitted to the central server. The server compares the measured levels with the thresholds stored in a table of definition of the event zones and comprising at least, for each event zone, the access point addresses of that zone and the corresponding signal strength threshold(s). If at least one of the strength measurements is lower than one configured threshold value, the station is considered located in the corresponding event zone. The station is identified with its address (IP address) which is uniquified on the network and dedicated to the physical corresponding object (the PC, the mobile phone, the Personal Digital Assistant, etc.).

Alternatively or in combination, according to the invention:

an event zone can include one or more access point attenuation ranges;

an access point can be included in more than one event zone;

the attenuation thresholds defining the attenuation ranges of several access points participating to a same event zone can be different from each other;

the attenuation thresholds defining the attenuation ranges of an access point participating to several event zones can be different from one event zone to another (for example, event zone EVB of FIG. 2 can be delimited with a coverage area of access point AP3 higher or lower (in term of attenuation) than −48 dB);

an event zone can be discontinuous, that is defined by non-overlapping coverage areas;

an event zone can be defined with more than one level threshold of a same access point (for example, an event zone can be delimited by two thresholds to define a ring around an access point);

the event zone in which is located a mobile station is independent to the access point through which this mobile station communicates with the central server. In some cases, a mobile station can communicate through an access point which does not serve to define the event zone in which the station is located; and only a part of the access points of the environment can be used to define the event zone(s).

An advantage of the present invention is to localize a mobile station not only with respect to the access points with which it communicates.

Another advantage of the invention is that the event zones are not physically fixed but can be modified as needed or even dynamically by applications or the station's user. Such a modification of the event zones only needs modifying the correspondence table stored in the central server (or in the associated database) between the access point addresses, the event zone identifying data and the signal level thresholds.

Another advantage of the preferred embodiment of the present invention is that no structural hardware modification of known access points, mobile stations or central servers is required. Indeed the measuring devices of the signal strength received from various access points are already provided in the mobile stations dedicated to communicate with the systems to which preferably applies the present invention.

The practical implementation of the invention based on the functional description above is in the ability of one with an ordinary skill in the art. In particular, the choice of the number of access points and their distribution based on the environment to be covered depends of the number and sizes of the event zones.

Having thus described at least one illustrative embodiment of the invention, various alterations, modifications and improvements will readily occur to those skilled in the art. Such alteration, modification, and improvements are intended to be within the spirit and scope of the invention. Accordingly, the foregoing description is by way of example only and is not intended to be limiting. The invention is limited only as defined in the following claims and the equivalent thereto.

The invention claimed is:

1. A localization method of a mobile station communicating with at least one central server through a wireless network comprising a plurality of wireless radiofrequency transmitting access points, among which a first access point is chosen to perform the communication, comprising:

measuring signal strengths received by said mobile station from the plurality of access points;

storing each measured signal strength with an address identifying the corresponding connected access point;

comparing said stored signal strengths to values of a predetermined table of signal strength thresholds assigned to access points, the signal strength thresholds defining one or more event zones (EZ), each event zone (EZ) comprising one or more attenuation ranges of one or more access points; and considering the mobile station as located in a given event zone if the measured signal strength corresponding to an access point in the given event zone is within an attenuation range of that access point, in which said attenuation ranges are a function of an environment and of a shape of a event zones (EZ).

2. A communication method between at least one mobile station and at least one central server through radiofrequency transmitting access points to which said station is wireless connectable, comprising:

establishing a communication between said station and said central server through a first access point of said access points from which said station receives a highest signal strength;

comparing a signal strength received by said mobile station from at least one second access point with at least one signal strength threshold used for defining at least one event zone (EZ); and making available for said mobile station at least one specific application of the central server if the station is considered in the event zone, in which the station is considered as being in the event zone by applying a localization method, the localization method comprising:

measuring signal strengths received by said mobile station from the plurality of access points;

storing each measured signal strength with an address identifying the corresponding connected access point;

comparing said stored strengths to values of a predetermined table of signal strength thresholds assigned to access points, the signal strength thresholds defining one or more event zones (EZ), each event zone (EZ) comprising one or more attenuation ranges of one or more access points; and considering the mobile station as located in a given event zone if the measured signal strength corresponding to an access point in the given event zone is within an attenuation range of that access point.

3. The method of claim 2, in which said station is considered to be in the event zone if the received signal strength is lower than said threshold.

4. The method of claim 2, in which said station is considered to be in the event zone if the received signal strength is higher than said threshold.

5. The method of claim 2, in which the communication is made according to one of the following unregulated spectrum standard suites: 802.11, 802.11a, 802.11b, 802.11e, 802.11f, 802.11g, 802.11h, 802.15.1, 802.15TG2, 802.15TG3, 802.15TG4, Bluetooth, Wi-Fi, HiperLAN1, and HiperLAN2.

6. A communication system between at least one mobile station and at least one central server through radiofrequency transmitting access points to which the station is wireless connectable, comprising:
    means to define, with at least a signal strength threshold of at least one access point, at least one event zone (EZ) in which at least one specific application of the server is to be available to the station if present in that zone;
    means to localize the mobile station with respect to an event zone boundary, based on a signal strength received by the mobile station from the access points,
    means to implement a communication between the mobile station and the central server through a first access points of said access point from which said station receives the highest signal strength; and
    means to compare signal strength received by the mobile station from at least one second access point with at least one signal strength threshold used for defining at least one event zone (EZ);
    wherein a specific application is available for the mobile station if the mobile station is considered in the event zone (EZ);
    wherein the mobile station is considered to be in the event zone if the received signal strength is lower than or higher than the threshold.

7. The system of claim 6, in which the localization means of the mobile station is performed at said central server on the basis of a table defining each event zone (EZ) with an attenuation range around one or more access points.

8. The system of claim 6, wherein the communication is made according to one of the following unregulated spectrum standard suites: 802.11, 802.11a, 802.11b, 802.11e, 802.11f, 802.11g, 802.11h, 802.15.1, 802.15TG2, 802.15TG3, 802.15TG4, Bluetooth, Wi-Fi, HiperLAN1, and HiperLAN2.

9. A wireless communication system, comprising:
    a server in communication with a plurality of wireless access points having an access point address assigned to each access point; and
    a database comprising an event zone table of the access point addresses and corresponding signal strength thresholds wherein each event zone is defined at least with a signal strength threshold;
    wherein said server is operable to receive signal level measurements and assigned access point addresses from a mobile station configured to measure signal levels received from the multiple access points, and to compare the received signal level measurement with a signal strength threshold for the assigned access point and determine whether the mobile station is located in the defined event zone;
    wherein each event zone is further defined with a signal attenuation range around one or more access point;
    wherein the multiple access point comprise a first access point and a second access point configured to be in the same event zone and a first signal attenuation range around the first access point is different from a second signal attenuation range around the second access point in the same event zone; and
    wherein the first signal attenuation range and second signal attenuation range overlap and the mobile station operates in at least one of the first signal attenuation range or the second signal attenuation range.

10. The system of claim 9, wherein the event zone table comprises a first event zone and a second event zone configured to include the same access point.

11. The system of claim 9, wherein the signal strength threshold of the event zone is modifiable with one of an application and the mobile station.

12. The system of claim 11, wherein the central server operates to modify the corresponding signal strength thresholds stored in the database.

13. The system of claim 9, wherein one or more access points transmit an application to the mobile station in the event zone and the application comprises at least one of service, software, or data.

14. The system of claim 9, wherein the access point addresses are unique in an environment and the environment is indoors.

15. The system of claim 9, wherein the server is operable to communicate a specific application associated with the defined event zone to the mobile station determined to be in the defined event zone.

* * * * *

UNITED STATES PATENT AND TRADEMARK OFFICE
CERTIFICATE OF CORRECTION

| | | |
|---|---|---|
| PATENT NO. | : 7,079,850 B2 | Page 1 of 1 |
| APPLICATION NO. | : 10/510415 | |
| DATED | : July 18, 2006 | |
| INVENTOR(S) | : Richard Neill Cameron | |

It is certified that error appears in the above-identified patent and that said Letters Patent is hereby corrected as shown below:

On the Title Page

In column 1, item (22), delete "Mar. 23, 2003" and substitute --Mar. 25, 2003-- in its place.

In column 1, line 1, under "Foreign Application Priority Data" delete "02354059" and substitute --02354059.4-- in its place.

Page 2, in column 1, line 11, under "U.S. PATENT DOCUMENTS", after "6,901,255" delete "B1" and substitute --B2-- in its place.

Page 2, in column 2, line 1, after "6,922,405" delete "B1" and substitute --B2-- in its place.

Signed and Sealed this

Twenty-seventh Day of March, 2007

JON W. DUDAS
*Director of the United States Patent and Trademark Office*